W. A. Greene.
Range.
N°. 81,362. Patented Aug. 25, 1868.

Witnesses
J. J. Savage
J. L. Baving

Inventor
Wm. A. Greene

United States Patent Office.

WILLIAM A. GREENE, OF TROY, NEW YORK.

Letters Patent No. 81,362, dated August 25, 1868.

HEATER-RANGE.

*The Schedule referred to in these Letters Patent and making part of the same.*

TO ALL WHOM IT MAY CONCERN:

Be it known that I, WILLIAM A. GREENE, of Troy, in the county of Rensselaer, and State of New York, have invented a new Improved Heater-Range for Cooking and Warming Purposes; and I do hereby declare that the following is a full and exact description of the construction and operation of the same, reference being had to the annexed drawings, and the letters of reference marked thereon, making a part of this specification, in which—

Figure 4 is a vertical sectional view, to show the bolts and nuts holding the jacket or casing to the range-front.

The blue lines, in said drawings, show the hot-air jackets, and the blue arrows currents of hot air.

The same letters refer to like parts in each of the said figures.

The object of my invention is to so improve and construct a heater-range in such a manner that it may be used as an effective cooking-apparatus, in warm weather, without consuming any more fuel in its fire-box than suffices for perfect cooking purposes, so that no extra or surplus heat is produced when not wanted for warming purposes, but, when heat is wanted for warming purposes, too, that then the said heater-range might be so operated as to produce sufficient heat for both warming and cooking purposes together, whenever so desired; and the nature of my invention consists in the improved construction and new combinations and arrangements respectively of certain component parts of a heater-range, in the manner substantially as hereinafter fully described and shown, and whereby the said heater-range is made more efficient, perfect, and economical in its operation as a cooking-apparatus in warm weather, and also efficient as both cooking and heating-apparatus in cold weather.

In order that others skilled in the art may construct and use my invention, I now proceed to fully describe the same, which is as follows, to wit:

In the annexed drawings—

Figure 1:
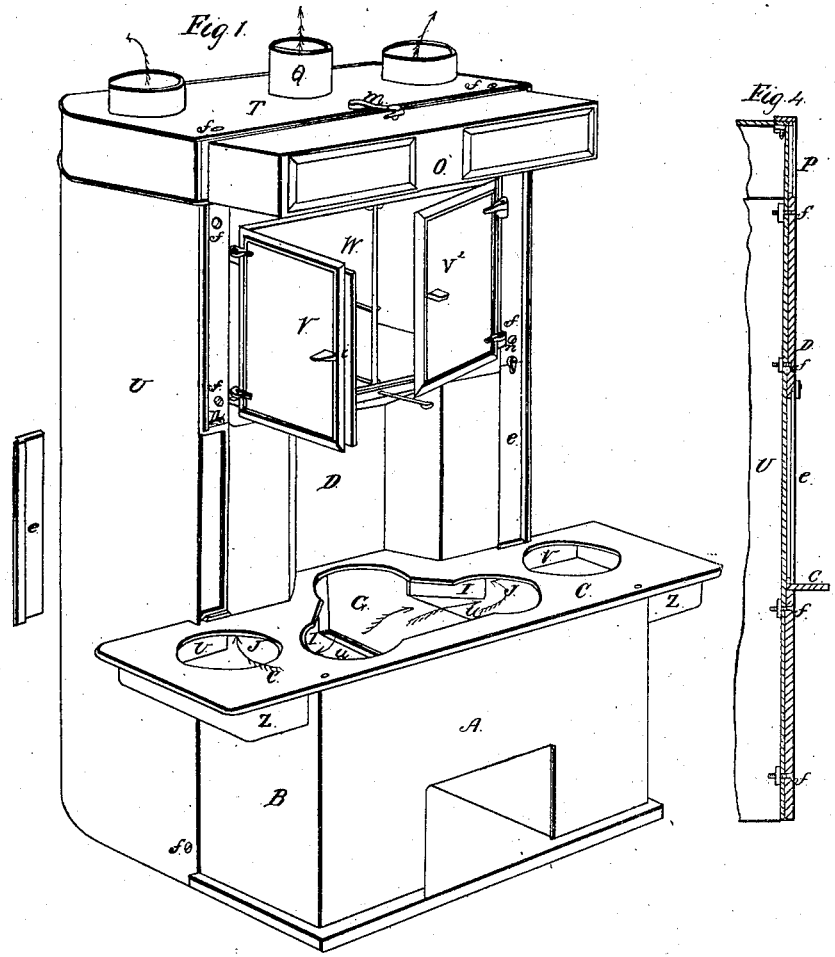
Figure 1 is a perspective view of said improved heater-range.

Figure 1 shows the general exterior construction of said heater-range, and with the fire-box, G, thereof, so as to be used in its full capacity for both warming and cooking purposes.

My improvements, as made in said heater-range, are shown more particularly and fully in fig. 2 of said drawings, wherein, to prepare the fire-box G for merely cooking purposes alone, and so as to economize in fuel therefor, a removable contracting-plate, H, is shown as placed in its proper position for use therein, and extending from the range-top, C to the fire-grate X below, and from side to side of the fire-box G, so as to divide completely the front part of the fire-box from its back part, and thus closing all direct communication with the back part of the fire-box, and the direct flue, F, therefrom, so that the gaseous products of combustion, which before passed from the front to the back part of the fire-box into the flue F, must now pass to the oven-flues and exit-flues by the flues J J and rising-flues E E, in manner about as shown by the red arrows therein.

This contracting-plate H, when placed into its proper position in the fire-box G in manner as shown, is so fixed that its lower or bottom part cannot be drawn forward or pushed backward in said fire-box, but remains in its fixed position therein until required to withdraw it entirely from said fire-box, so as to use the whole capacity thereof.

Figure 3:
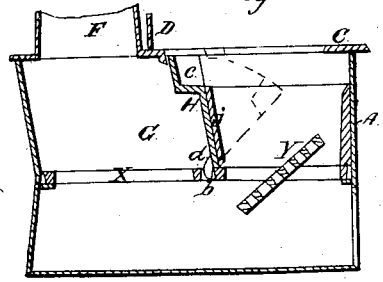
Figure 3 is a vertical sectional view lengthwise of the fire-box thereof, showing the manner of holding a contraction-plate in its proper position therein, and also a manner of removing it therefrom.

Said contracting-plate H is held fixedly in its proper place, when in use, by means of lugs $b\ b$, projecting from its lower edge, and passing into openings or sockets, $a\ a$, in the fixed grate X, in manner substantially as shown in fig. 3, whilst its top part rests on a flange on the under side of the range-top C, which, together with the somewhat-inclined position and recessed upper part of said plate, keeps it in its proper fixed position in said fire-box G, so that, in operating the front fire-box, the said plate is not displaced therefrom by dumping the grate thereof or raking the fire therein. and when the full capacity of the fire-box G is wanted, said contracting-plate is easily removed therefrom, by tipping its upper part forward, in manner as shown in dotted lines in fig. 3, when it may then be withdrawn wholly from the fire-box.

The fire-side of said contracting or dividing-plate H is protected by a fire-brick or soapstone lining, $j$, held in its place by the dove-tailed or grooved ends of the said plate.

The top of plate C is provided with boiler-holes, and the upper part of said contracting-plate H is made in an arched or curved recessed form, $c$, substantially, and so as to conform to the curve of the boiler-hole $q$, as shown, thereby bringing said boiler-hole over the fire-heat without unduly increasing the size of the said divided front part of the fire-box G.

Figure 2:
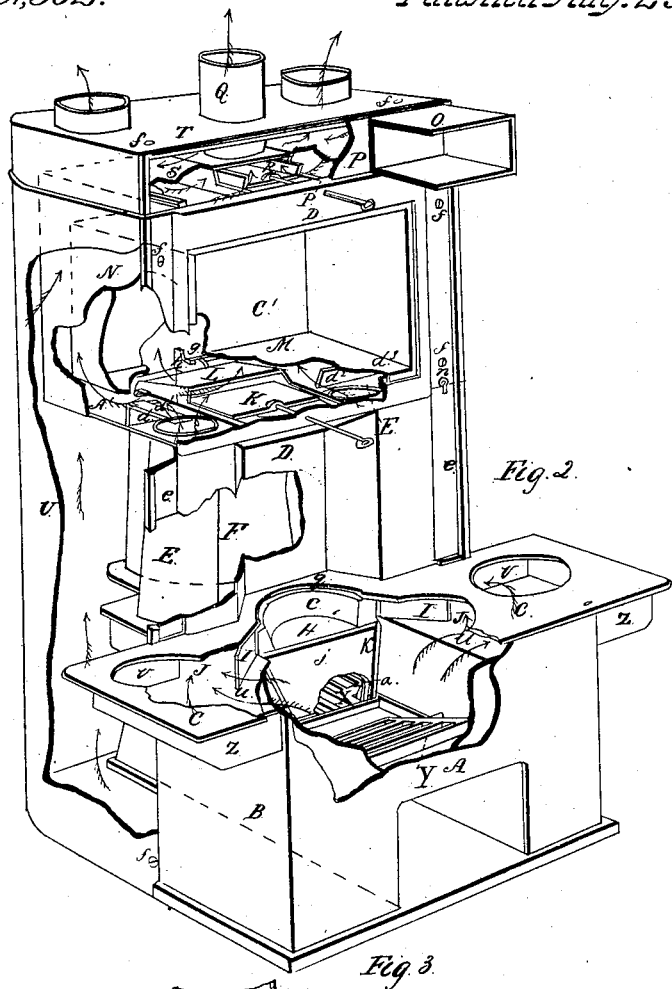
Figure 2 is a sectional or broken perspective view of the same, to show parts of its interior construction.

Arranged in combination with the aforesaid contracting-plate H, and its curved upper part, $c$, the fire-box G, and boiler-hole top plate C, are the deflecting-plates I I, which are arranged respectively in diagonal vertical positions relatively to and in the boiler-hole flues $u\ u$ and J J, substantially in manner as shown in fig. 2 aforesaid, and so as to thereby prevent a too rapid escape of heat from the fire-box G into the rising-flues E E, and to deflect and reverberate the heat more under and about the boiler-holes and vessels placed therein, in manner about as shown by the red arrows in said fig. 2.

L, in fig. 2, is a deflecting-plate, constructed with close ends, and an inclined or sloping top part, in such a manner that one of the open sides of said plate shall be about double or more in area or capacity of opening than its opposite open side is.

This said plate, as thus constructed, is arranged and secured by bolts, or other suitable means, in the bottom flues of the oven, M, and directly over the opening of the direct flue, F, and with its sloping top or cover part toward the rear or back part of the said oven-flue, so as to have its greatest open side aforesaid toward the front part of said oven-flue, in manner substantially as shown in said fig. 2, which, together with the inclined top part or cover of said plate, deflects the greater part of the rising heated products of combustion in said flue F, through the aforesaid greater opening toward the front parts of said bottom oven-flue, so that, by their reverberation thereunder, a more equalized baking-heat under and about the front parts of said oven is obtained.

K is a damper, which is arranged to slide under the top and between the ends of the aforesaid plate L, and, when closed, shuts off the direct flue and draught from the back part of the fire-box G.

Arranged in combination with the indirect flues E and E, and in the oven-bottom flues, are the deflecting-plates $d\ d^1$ and $d^2\ d^3$, substantially as shown, and for the purpose of deflecting currents of heat from said flues more toward the central parts of the oven-bottom.

The removable panels $e\ e$ and P, held in place by buttons or other devices, are employed with the range-front D, its jackets or outer casing, U and T, and fastening-bolts, $f$, thereof, and they are so arranged relatively to the location of said bolts $f$, that when the said panels are removed from their said places, as shown, the nuts of the holding-bolts $f$ are accessible to be unscrewed therefrom, so as to give access to dismount and remove or repair, without disturbing the jackets and casing aforesaid, such parts of the range and air-heating flues as may be necessary.

The aforesaid removable panels, as thus relatively arranged, make unnecessary the disturbing of the metal or brick-work encasing said heater-range, when repairs, as aforesaid, are needed.

In setting this heater-range in brick-work, its economy of operation is improved by having a metal jacket or lining next to the brick-work, which prevents the escape of hot air through shrink-holes or cracks which form in brick-work.

Within the oven M of said heater-range there is arranged, midway thereof and vertically, a removable partition-plate, W, and so that the flange $i$ of the oven-door V, when shut, may lap on and closely cover the edge of said plate, to thereby form a close joint, and so divide the said oven, whenever wanted, into two distinct and independent parts, as shown.

In the top oven-flue of this heater-range there is placed a regulating-damper, R, to control and regulate the draught and exit of the gases of combustion from the lower flues and fire-box into the chimney-flue.

This improved heater-range, after being properly mounted and set in its casing or jacket of brick-work or of metal, or both combined, and provided with cold and hot-air pipes or flues, in the usual way, is then ready for operation, and it is operated in manner as follows:

For combined heating and cooking in cold weather, the whole capacity of the fire-box G is or may be employed, which is sufficient to furnish heat for both purposes in all ordinary cold-weather in winter. In very severe cold weather, the damper K may be opened, which gives a direct draught from the fire-box G toward and about the back parts of the fire-box, and up the flue F, which parts, becoming hotter, radiate more heat into, and heat the hotter air in the air-heating chamber and flues, and so producing extra warming-heat.

When necessary to boil or heat quickly the contents of vessels placed in the end boiler-holes of the range-top, close the damper K, thus shutting off the direct draught, which causes the heated products of combustion to be deflected by the plates I I aforesaid under and about the boiler-hole flues and vessels therein, thence into the front rising-flues E E and oven-flues to the exit-pipe.

For baking operations, the oven operates equally well with the heat passing either through the direct flue F or indirect flues E E aforesaid, and cooking over or in the central boiler-holes is, too, in either case, as equally well done.

For cooking in warm weather, and when no heating of rooms is required, and to economize in fuel and avoid inconvenient and waste heat, the fire-box G is contracted and divided by means of the contracting-plate aforesaid, which divides completely the range part of the said fire-box from the heater part, by placing the said plate into its proper position therein, in manner as hereinbefore set forth and shown, so as to make completely available for use only about one-half of the original size of said fire-box G, and the heated products of combustion now pass toward and are deflected by the plates I I aforesaid, and reverberate under and about the boiler-holes of the flues $u\ u$, thence into the flues E E, and up through the oven-flues and exit-pipe, and giving sufficient heat for all cooking operations.

Having thus fully described my improved heater-range, what I claim as my invention, and desire to secure by Letters Patent, is—

1. The removable contracting or dividing-plate H, lined with fire-brick or soapstone, and combined with the boiler-hole top plate C, fire-box G, and exit-flues J E J E therefrom, all in manner substantially as shown, and fully described hereinbefore, for the purposes specified.

2. The combination of the fire-box G, boiler-hole top plate C, the dumping fire-grate Y, the contracting-plate H, and the stationary fire-grate X, which forms a fixed support for the foot or bottom part of said plate H, all in manner substantially as shown, and described herein, for the purposes specified.

3. In combination with a boiler-hole, $q$, of top plate C, the curve $c$, in the upper part of a removable contracting-plate, constructed so as to fit or correspond with the said boiler-hole, substantially as set forth herein.

4. The relative arrangement of the deflecting-plates I I, in the boiler-hole flues $u\ u$, when employed in combination with the removable contracting-plate H, with its curved recess $c$, boiler-hole top plate C, fire-box G, and flues J J, in manner substantially as herein set forth.

5. The deflecting-cover plate L, when constructed with closed sides and open ends, and inclined so that there may be a greater current towards the front, and combined with the direct flue F and oven-plate M, substantially as herein shown and described.

WM. A. GREENE.

Witnesses:
   J. J. SAVAGE,
   J. L. BARNEY.